United States Patent [19]

Stefani

[11] Patent Number: 4,664,541
[45] Date of Patent: May 12, 1987

[54] MICROPROGRAMMED CONTROL APPARATUS FOR DOT MATRIX SERIAL PRINTERS

[75] Inventor: Giannico Stefani, Arese, Italy

[73] Assignee: Honeywell Information Systems Italia, Caluso, Italy

[21] Appl. No.: 624,088

[22] Filed: Jun. 25, 1984

[30] Foreign Application Priority Data

Jul. 15, 1983 [IT] Italy ................................ 22096 A/83

[51] Int. Cl.[4] .............................................. B41J 3/12
[52] U.S. Cl. .................................... 400/124; 400/303;
101/93.05
[58] Field of Search ............... 400/124, 303, 306, 121;
101/93.04, 93.05; 364/200, 900

[56] References Cited

U.S. PATENT DOCUMENTS

| | | | |
|---|---|---|---|
| 3,627,096 | 12/1971 | Finnegan | 400/124 |
| 4,204,090 | 5/1980 | Heinzl | 178/30 |
| 4,278,359 | 7/1981 | Weikel | 400/303 |
| 4,284,362 | 8/1981 | Jackson | 400/124 |
| 4,458,333 | 7/1984 | Smith | 400/124 X |
| 4,468,141 | 8/1984 | Rosza | 400/124 |
| 4,508,463 | 4/1985 | Wang | 400/124 |

FOREIGN PATENT DOCUMENTS

| | | | |
|---|---|---|---|
| 40313 | 11/1981 | European Pat. Off. | 400/124 |
| 56081 | 7/1982 | European Pat. Off. | 400/124 |
| 2034087 | 5/1980 | United Kingdom | 400/124 |

*Primary Examiner*—Paul T. Sewell
*Attorney, Agent, or Firm*—George Grayson; William A. Linnell; John S. Solakian

[57] ABSTRACT

A microprogrammed control apparatus for dot matrix serial printers and related printing method which allows increased horizontal resolution of the printing matrix and therefore the printing quality consistent with the restriction that no printing element can be actuated before a previous energization of any printing element has been completed. The increase of the horizontal resolution is obtained by using a character description matrix with high resolution and logic circuits responsive to binary configurations read out from such matrix. In a preferred alternative, the increase of the horizontal resolution is obtained by using a "compressed" character description matrix containing a plurality of printing patterns, one for each of the columns where printing has to be performed (hereinafter "column to be printed") and a corresponding plurality of codes, each related to a printing pattern and representative of the distance/time interval between the column to be printed and the previous column to be printed.

5 Claims, 7 Drawing Figures

MICROPROGRAMMED CONTROL APPARATUS FOR DOT MATRIX SERIAL PRINTERS

BACKGROUND OF THE INVENTION

1. Field of the Invention

The present invention relates to a microprogrammed control apparatus for dot matrix serial printers and to a related printing method which produces a better printing quality.

2. Description of the Prior Art

Dot matrix serial printers are widely used in data processing systems and in communication systems. In such printers, a printing head provided with a plurality of needles or, more generally, of printing elements arranged in a vertical column moves transversely to a printing surface. The selective and timed actuation of the needles during the head movement allows the printing of alphanumeric characters by impression of pre-established dots of a matrix. Printing heads with 7 or 9 needles are generally used. They generate characters formed by dots arranged according to a matrix of 7 or 9 horizontal rows and 5 or 9 vertical columns. The appearance quality of the symbols so obtained is poor due to the limited number of printable dot positions, but the printing speed achieved by the printers is very high compared with their cost.

A biunivocal relation exists between the printing speed and the horizontal resolution of the printing matrix. That is, the number of columns of printable dots composing a character determines maximum printing speed because the printing elements, or needles, have a determined and pre-established actuation time. Typically, this time may range from 500 microseconds to 2 milliseconds. The actuation time of a printing needle is comprised of an energization phase and a return phase.

During the energization phase, an electromagnet coupled to the needle is energized and the needle is thrown against the printing surface. During the return phase, the needle, after having printed a dot on the printing surface, returns to a rest position. Typically, the duration of the two phases is equal or the energization phase is slightly shorter than the return phase.

A printing element cannot be energized again before the previous actuation time has elapsed. In order to obtain a character through the impression of dots arranged in a matrix of 5 columns, if the actuation time of an element is, for instance, 2 msec., the time required to print such a character is 10 msec. It is therefore possible to obtain a printing speed of 100 characters per second.

The translation speed of the printing head defines the character width, not the printing speed, and it is generally chosen so that the printed or printable dots are contiguous. For example, if the printed dots have a diameter of 0.26 mm (about 10 mils), the translation speed is chosen so that consecutive horizontal dots are arranged at a distance of about 0.26 mm center to center.

It is obvious that if a character with the same width of the previous one is to be printed through the impression of dots arranged according to a 10 column matrix, to obtain a character with a better horizontal resolution where consecutive dots printed on the same line partially overlap, it is enough to halve the translation speed of the printing head. The printing speed in characters per second is also obviously halved.

A higher horizontal resolution has not only the purpose of obtaining continuous horizontal lines resulting from the composition of contiguous dots which partially overlap, it also has the purpose of allowing the printing of oblique lines through the composition of dots belonging to different rows and columns but close enough to give the appearance of a contiguous line. The higher the horizontal resolution is, the higher is the number of diagonals with different slopes, which may be printed and which satisfy such condition. This is obviously obtained to the detriment of the printing speed.

On the contrary, it is desirable to obtain a better printing quality of the alphanumeric characters without substantially affecting the printing speed.

A first partial solution of this problem is given by the French Pat. No. 2,042,947. As the printing of a diagonal line requires the actuation of different printing elements, an element can be actuated before the actuation time of the other elements is elapsed. By such method, it is possible to define a printing matrix with double density as to the normal one where the column spacing corresponds to the actuation time of the printing elements. Printing operations are possible in the additional intermediate columns, too. The only constraint to be respected is that an element must not be actuated with a frequency greater than the one allowed by its actuation time. The higher printing matrix resolution obtained with this artifice does not involve any speed reduction.

A more general solution of this problem is suggested and described in U.S. Pat. No. 4,159,882. Briefly, keeping in mind that a printing element can be actuated independently from the other printing elements, the U.S. Pat. No. 4,159,882 discloses a control system for a matrix serial printer wherein the alphanumeric characters are represented by a matrix having a virtually infinite horizontal resolution, that is, an extremely high number of columns. This allows the printing of diagonal lines with any slope without a substantial reduction of the printing speed, but involves the use of expensive and complicated control circuits. To use this method, each printing element must be particularly provided with an autonomous control circuit which may be enabled in any time corresponding to any one of the character matrix columns, virtually infinite. Such control circuit, when enabled, generates an energization signal of predetermined duration for the corresponding element. In this case too, the condition must be respected that the same element not be energized at intervals shorter than its actuation time.

The above concept cannot be used in conventional matrix printers where the control system is much more simplified and comprises an actuation control unit common to all the printing elements. In such matrix printers, the control system includes a microprocessor, a first and a second timer, a printing element control register, and a character generator comprising a memory for storing binary codes which define the position of the printing dot within the printing matrix. The first time periodically activates the microprocessor at a pre-established interrupt period, which defines the printing matrix horizontal resolution which is the product of the translation speed of the printing head and the interrupt period. The microprocessor, when interrupted, loads the control register with a binary code read out from the character generator and is processed, if necessary. Meanwhile, the microprocessor activates the second timer which produces an energization signal of determined length. The binary code, or printing pattern, has a number of bits equal to the number of printing needles of the printing head, each bit being associated with a needle. Such binary code defines with the logical level of its bits which needles must be actuated. The logical level signal corresponding to each bit of the printing pattern is ANDed with the energization signal. The signals resulting from such logical AND operation are individually used for controlling the selective energization of the several printing elements. The duration of the energization signal corresponds to the printing element's energization time.

It is clear that in order to allow a correct energization of the printing elements, the interrupt period must be longer than the energization time even if the execution of printing operations corresponding to a subsequent printing pattern involves the energization of different elements and can therefore be simultaneous with the return phase of the already energized elements. The result is that the printing matrix horizontal resolution is limited to a level which does not allow the printing of good quality characters unless unacceptable reductions of the printing speed are introduced. Such limitation is overcome by the microprogrammed control apparatus and related printing method of the present invention.

OBJECTS OF THE INVENTION

Accordingly, it is an object of the present invention to provide a printing apparatus and method that produce an improved character quality with a small reduction in printing speed.

It is a still further object of the present invention to provide a low cost printing apparatus with improved printing quality.

This invention is pointed out with particularity in the appended claims. An understanding of the above and further objects and advantages of this invention can be obtained by referring to the following description taken in conjunction with the drawings.

SUMMARY OF THE INVENTION

The invention, as claimed, obtains the printing of quality characters according to a high horizontal resolution printing matrix with a small printing speed reduction and by using a simple and inexpensive control apparatus wherein the energization time length of the printing elements is controlled by a control unit common to all the elements. According to the invention, this is obtained by using a character generator which defines the character shape according to the printing matrix having a resolution higher than the one allowed by the energization time length of the printing elements. Logic means in the control apparatus prevent the loading of the printing element control register and the activation of the timer, which defines the energization period of the printing elements, whenever no impressions must be performed in a printing matrix column.

Several embodiments may be used for implementing the invention. In the simplest embodiment, the information stored in the character generator is organized in a conventional way, that is, as binary codes each one representative of the printing pattern corresponding to the prefixed printing matrix column for a pre-established character. In the control apparatus, the logic means, which prevent the loading of the control register, may be comprised of logic circuits dedicated to this purpose, but the same function can be carried out by the microprocessor itself with its own circuits.

According to a preferred embodiment, the character generator is organized in such a way as to include binary codes, each related to the printing pattern of one of the printing matrix columns for a determined character only for those printing matrix columns which require at least one impression. In addition, a second variable binary code is associated with each binary code related to a printing pattern. This second binary code indicates the distance, in number of columns, of the corresponding matrix column from the previous matrix column which required at least one dot impression. This variable second code is loaded each time into the timing unit, which periodically interrupts the microprocessor and defines its activation period and therefore the printing matrix resolution. In this way, a printing matrix with variable resolution is obtained, that is, a matrix with variable distance between printing columns. In other words, within a printing matrix with high resolution, all the printing columns where no dot impression has to be performed are masked.

The above preferred embodiment, besides solving the problem of obtaining high quality printing, also reduces the size of the character generator to a minimum and, on the average, the microprocessor interruption frequency. In this way, the microprocessor is less busy and may devote more time to handling or controlling operations other than printing, such as character reception from a line, control of the printing head carriage motor, control of paper feed mechanisms, and the detection of correct or anomalous working of the printer.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

The advantages and the features of the invention will appear more clearly from the following description and from the enclosed drawings where.

DESCRIPTION OF THE PREFERRED EMBODIMENT

Figure 1:
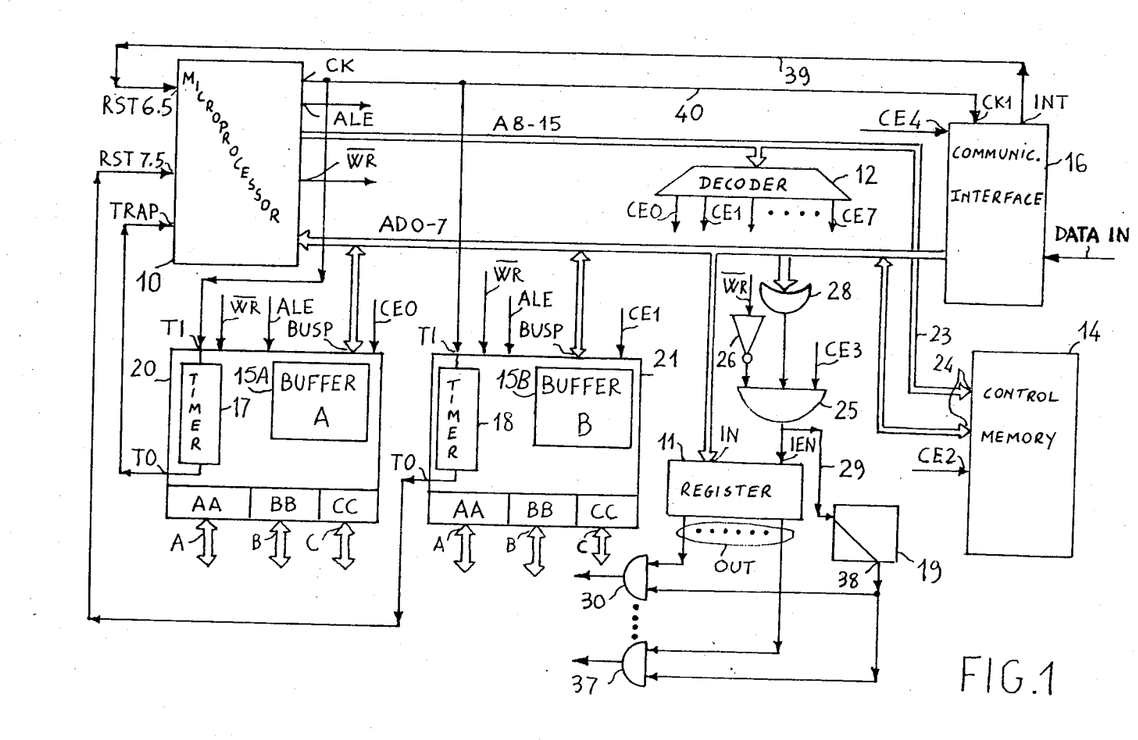
FIG. 1 shows a first preferred embodiment of the apparatus according to the invention.

FIG. 1 schematically shows a microprogrammed control apparatus for a matrix serial printer according to a first preferred embodiment of the invention. Such embodiment is illustrative and suitable for a printer provided with a column of 7 or 8 needles. The changes required to adjust it to printers provided with 9 or more needles will be obvious to those skilled in the art.

The apparatus comprises a microprocessor 10, a register 11, a control memory 14, working memories 15A and 15B, a programmable communication interface 16, and three timing units 17, 18 and 19. All these devices are available as integrated circuits. For instance, the U.S. firm Intel markets some of these devices: microprocessor 10 is Intel part number 8085, control memory 14 is Intel part number 8355, and programmable communication interface 16 is Intel part number 8250. Timing units 17 and 18 and working memories 15A and 15B in elements 20 and 21, respectively, can be constituted by two integrated circuits, Intel part number 8115, each comprising a programmble timer, three input/output ports (A, B, C), and a read/write memory of 256 bytes (BUFFER A, BUFFER B). Register 11 may be constituted by an integrated circuit manufactured by the firms of Texas Instruments, Fairchild, and Motorola as part number LS373. For detailed information about such devices, reference is made to the manufacturer manuals which are incorporated herein by reference. Only the information necessary to understand the operation of the disclosed apparatus will be supplied in the following description.

Microprocessor 10 is provided with 8 input/output terminals for data and addresses which are connected to 8 leads. Such leads constitute bus AD0-7. Microprocessor 10 is provided with 8 address output terminals which are connected to 8 leads. Such leads constitute an addresss bus A8-15. The three most significant bits (A13, A14, A15) are connected to the inputs of a decoder 12 provided with 3 inputs and 8 outputs CE0 through CE7. The signals present on such outputs, in a mutually exclusive way, are used as selecting signals of one of eight units (registers, memories, gates). Microprocessor 10 is further provided with some inputs/outputs for timing and control signals, among which the following ones are pointed out: an output CK for supplying the other system components with a cyclical timing signal; three interruption inputs RST 7.5, RST 6.5, and TRAP to receive three different program interruption signals; and an output WR-bar for supplying a write strobe signal. Output WR-bar normally is a logical 1 and transitions to a logical 0 to strobe write operations.

Programmable port circuits 20 and 21 are provided with 8 input/output terminals BUSP connected to bus AD0-7 and with three sets of input/output ports A, B and C having 8, 8 and 6 terminals, respectively. Port circuits 20 and 21 are programmable in the sense that the transfer direction of several input/output sets can be pre-established through suitable commands. Circuits 20 and 21 include a bank of 256 8-bit registers which may be used as working memory. In FIG. 1, they are designated as BUFFER A and BUFFER B. Circuits 20 and 21 further include timing counters 17 and 18, respectively, and buffer registers AA, BB and CC for ports A, B and C, respectively. Counters 17 and 18 may be preset to a predetermined binary value. Circuits 20 and 21 are further provided with: an input T.I. for receiving timing pulses; and an output T.O. for sending a timing signal to microprocessor inputs TRAP and RST 7.5, respectively. Responsive to a suitable instruction received through terminals BUSP and presetting counter option, the pulses received on terminal T.I. make the internal counter count down. When the internal counter reaches the binary 0 state, a timing signal is outputted on terminal T.O.

Circuits 20 and 21 also have inputs CE0 and CE1, respectively, for receiving a circuit selection/enabling signal. These inputs are connected respectively to the CE0 and CE1 outputs of decoder 12, as well as an input ALE and WR-bar for receiving the ALE and WR-bar signals output by processor 10.

Control memory 14, having 2 K (1 K=1024) words of 8 bits each is provided with 12 address inputs 24. Eight of these address inputs 24 are connected to bus AD0 ∝ 7 and are also used as memory output terminals. The remaining 4 address inputs 24 are connected through lines 23 to suitable leads of bus A8-15. A greater capacity of the control memory can be obtained with a higher number of the above mentioned components. Memory 14 is further provided with some control inputs receiving control signals from microprocessor 10. For the sake of simplicity, only input CE2 of memory 14 is shown, which receives a memory selecting signal from the output CE2 of decoder 12.

Register 11 is a register for latching the control information used to energize the printing needles. Register 11 is provided with a set of 8 inputs, IN, connected to bus AD0-7, with a strobe input, IEN, and with a set of 8 outputs, OUT. Input IEN of register 11 is connected to the output of a three input AND gate 25. An input of AND gate 25 is connected through inverter 26 to output of WR-bar of microprocessor 10. A second input of AND gate 25 is connected to the output of an OR gate having 8 inputs connected to bus AD0-7. A third input of AND gate 25 is connected to output CE3 of decoder 12. The output of AND gate 25 is further connected, through line 29, to the input of timer 19.

Figure 2:
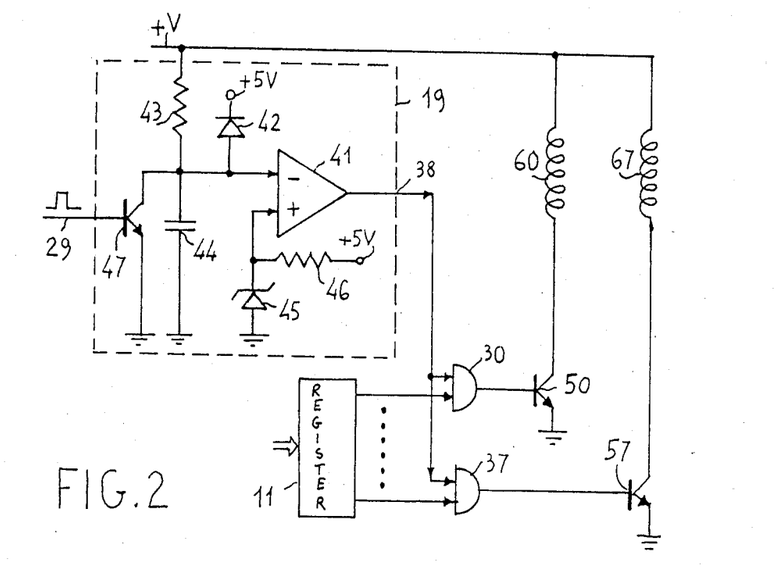
FIG. 2 shows a control unit for the printing elements as used in the apparatus of FIG. 1.

Timer 19, shown as a univibrator, is preferably carried out as shown in FIG. 2 and described later on. That is, as a timing circuit which, activated by an input pulse, supplies an output control signal having a period inversely variable with a supply voltage. Each one of the eight output terminals of register 11 is respectively connected to the input of two input AND gates 30 through 37. The second input of AND gates 30 through 37 is connected to output 38 of timer 19. Timer 19 defines the energization time interval of the printing elements. The signal present on the 8 output terminals of register 11 constitute a selection code for the several printing elements.

The programmable communication interface 16 receives some input data, DATA IN, as serial binary code from a modem. The operations of interface 16 are timed by a timing signal received at an input CK1 connected to output CK of microprocessor 10 through line 40. Once the reception of a datum is completed, communication interface 16 generates an interrupt signal on an output INT. Output INT is connected to input RST 6.5 of microprocessor 10 through line 39. When microprocessor 10 receives the interrupt signal on its input RST 6.5, or when it is able to consider such signal, it generates a set of signals on lines A8-15. Such signals, when decoded, produce an enabling signal on output CE4 of decoder 12. Output CE4 is connected to a corresponding selection input of communication interface 16. When interface 16 receives such enabling signal, it puts the received datum on bus AD0-7 and sends it to processor 10.

The printer operations are controlled by the disclosed apparatus through microprocessor 10 and suitable microprograms stored in the control memory 14. Substantially, microprocessor 10 operates according to the following microprograms.

LINE PROCESS MICROPROGRAM

The line process microprogram controls the reception of the data from the line through communication interface 16; it examines the received data to recognize the characters to be printed and the control characters and loads the received data into the working memory. The codes of the characters to be printed are loaded in order into a working memory zone named "row buffer". The codes of the control characters are loaded in order into a working memory zone named "control buffer".

Within the line process microprogram, a conversion routine reads out from the row buffer, one at a time, the character codes in the required printing order and, according to such codes, it addresses a zone of the control memory 14 named "character generator". The character generator constitutes a set of tables, one for each different character of a graphical set. In its turn, each table is constituted by binary codes, each stored in a memory addressable location. These codes indicate in a coded way which dots are to be printed within a printing matrix for obtaining the desired character shape.

Generally, each binary code represents a "printing pattern", that is, the printing configuration corresponding to a pre-established printing matrix column for a determined character. In other words, each bit of the binary code corresponds to a point of the printing colummn and defines with its status of a binary 1 or 0 wether an impression must be effected or not in the corresponding column point. Other representation forms can however be used.

The conversion routine for each character to be printed reads out the binary codes in sequence from the corresponding character table, processes them if necessary to convert them into a "printing pattern", and stores them in suitable number into a working memory zone named "circular accumulator" or "queue". The line process microprogram further loads into a suitable location information or indicators useful for the process control such as: line buffer full or empty; and queue full or empty.

CARRIAGE MOTION PROCESS MICROPROGRAM

The carriage motion process microprogram generates the timed commands required to control the motor which moves the printing head along the printing line with a constant speed. As disclosed later on, such microprogram uses timer 18 as the timing unit.

PAPER MOTION PROCESS MICROPROGRAM

The paper motion process microprogram generates the timed commands required to control the motor which moves the printing surface transversally to the printing line.

PRINTING PROCESS MICROPROGRAM

The printing process microprogram reads out with a predetermined frequency, one at a time, the printing patterns from the circular queue in the order in which they were loaded and loads them into register 11. It further loads timer 17 with a timing binary code which defines the repeating period of the printing process.

CONTROL PROCESS MICROPROGRAM

The control process microprogram controls the proper working the printer and provides for its initialization. The several processes are not executed independently of one another, nor during separated and subsequent periods but, generally, executes in a overlapped way in time sharing. Thus, the control process microprogram may be interrupted at any instant by the other microprograms. The line process is activated by interrupts sent by communications interface 16 and it may be interrupted at any instant by the printing paper motion or carriage motion processes, except that in the very short phases of reception of the characters from interface 16 and of character loading into the line buffer. Once the line process has completed its operations, it returns the control to the control process.

If the control process acknowledges a pending printing command, it contemporaneously activates the carriage motion process and the printing process. The two processes, once activated, go in parallel by means of timed interrupts which periodically recall them. The printing process has the higher priority. When the printing and carriage motion processes are completed, the control process is recalled. In a similar way, the paper motion process is activated by the control process; then it goes on autonomously by means of timed interrupts which periodically recall it and, when it is completed, the control process is recalled. Some aspects of such processes which are useful for the understanding of the invention will be described in detail later on.

FIG. 2 shows in detail a circuit embodiment of timer 19 of FIG. 1 and, more generally, of the printing elements control unit.

Timer 19 comprises a capacitor 41, a diode 42, a resistor 43, a capacitor 44, a Zener diode 45, a resistor 46, and a transistor 47. The base of transistor 47 is connected to line 29, through which it receives a short command pulse at logical/electrical level 1 when register 11 is loaded. Normally, this command is at logical-/electrical level 0. The emitter of transistor 47 is connected to ground. The collector of transistor 47 is connected to the inverting input of comparator 41. Capacitor 44 is connected between the inverting input and ground. Resistor 43 connects the comparator inverting input to a voltage source +V in the order of ten volts. Diode 42 connects the comparator inverting input to a voltage supply of five volts. A reference voltage of about 3.5 to 4 volts is applied to the non-inverting input of comparator 41. This reference voltage is obtained by Zener diode 45 which has its anode connected to ground and its cathode connected to the comparator non-inverting input and, through resistor 46, to the voltage supply of five volts.

The operation of the timer is very simple. When the circuit is fed, the capacitor is normally charged to a voltage limited to about 5.7 volts by diode 42. Such voltage is applied to the inverting input of comparator 41 while the non-inverting input is at about 4 volts. Therefore, the comparator output is at logical level 0. When a short positive pulse is applied to the base of transistor 47 (which may be substituted by an open collector NOT gate), transistor 47 switches on and capacitor 44 rapidly discharges. The inverting input of comparator 41 falls to logical level 0 and output 38 rises to logical level 1. When the command pulse of transistor 47 ends, capacitor 44 starts to charge through resistor 43 with a time constant RC determined by its capacity and by the value of resistor 43. After a certain time, depending on the voltage supply +V, the voltage at the inverting input of comparator 41 exceeds the reference voltage and comparator output 38 falls to logical level 0. The pulse output from comparator 41 has a time duration length which varies according to the supply voltage and it is used to control the energizatiaon of the printing elements.

Comparator output 38 is connected to an input of AND gates 30 through 37. A second input of AND gates 30 through 37 is connected to a corresponding output of register 11. The output of each AND gate 30 through 37 is connected to the base of corresponding control transistors 50 through 57 having an emitter connected to ground and a collector connected to an end of a printing element windings 60 through 67, respectively, whose second end is connected to voltage supply +V.

The control circuit of FIG. 2 therefore energizes at the same time for a time interval determined by timer 19 all the printing elements specified by the binary code or printing pattern stored in register 11. The time interval determined by timer 19 is suitably chosen in order to obtain a proper energization of the printing elements. Timer 19 further compensates the energization time interval to possible variations of the supply voltage. The circuit is very simple and inexpensive and for this reason it constitutes a preferred alternative to a plurality of individual control circuits, each for energizing a single printing element, which are more expensive.

As already mentioned, proper operation requires that timer 19 must not be activated and the content of register 11 must not be modified for the whole energization time interval of the printing elements. A lower limit to the horizontal resolution of the printing matrix is therefore imposed. After these preliminary remarks, the apparatus of FIG. 1 and the printing process executed by such apparatus can be considered pointing out how the invention overcomes the above restriction.

It is supposed that the energization time interval determined by timer 19 varies from 700 to 900 microseconds according to the energization voltage changes and that the actuation time of the printing element is not longer than 2 milliseconds. Further, it is supposed that microprocessor 10 operates with an elementary cycle of 333 nanoseconds and that it provides an output clock pulse, CK, with equal periods each cycle. It is also supposed that the printing has to be effected according to a desired printing matrix of 18 columns with horizontal resolution, expressed in time of 500 microseconds.

The horizontal resolution of the printing matrix, as concerns the distance, is obviously given by the product of the mentioned time and the translation speed of the printing head. For this purpose, at the beginning of a printing process, microprocessor 10 loads timer 17 with a binary code equal to 500.10 to the minus 6 divided by 333.10 to the minus 9 or approximatly 1501 and then activates timer 17. Timer 17 decrements by one unit for each timing pulse received on its TI input and when its content is zero, that is after 500 microseconds, it emits on its TO output an interrupt signal which is applied to the TRAP input of microprocessor 10.

The microprocessor interrupts the process in progress and recalls the printing process microprogram. Microprocessor 10 loads timer 17 with the binary configuration equal to 1501 and the process is repeated. The operations of interrupt, printing process recall, loading and actuation of timer 17 are performed in a few cycles of microprocessor 10, that is, in a neglectable time compared to the period of 500 microseconds. Nevertheless, this time may be taken in account by determining its time duration and loading timer 17 with a binary code representative of 500 microseconds less such time duration. Therefore, microprocessor 10 together with timer 17 defines a printing matrix with a resolution of 500 microseconds.

Each character table within the character generator is constituted by a number of binary words equal to the number of the printing matrix columns (18 in the example). Each word of the character tables therefore defines a column printing pattern of the printing matrix, and a number of ordered patterns equal to the number of matrix columns defines an alphanumeric character in the matrix with the following restrictions. First, if a printing pattern defines at least one printing position, all the subsequent patterns at a distance expressed in time, less than the period of timer 19, must be empty. That is, they cannot define any printing position. Since in the above exemplary case the distance between two consecutive patterns is 500 microseconds, if a pattern defines one or more printing positions, the subsequent pattern must be empty. If a pattern defines no printing positions, the following patterns may define printing positions because their distance is longer than the period of timer 19. Second, if a printing pattern defines a printing position, all the subsequent patterns for a distance expressed in time less than the actuation period of the printing elements (2 millisecods) cannot define a printing operation for the same position. In other words, if a pattern defines a printing operation on a row, the subsequent three patterns cannot define any printing operation on the same row.

With these restrictions, the use of a printing matrix having a resolution greater than the one allowed by the period of timer 19 is made possible by the control apparatus of the invention. In fact, when microprocessor 10 must print a character indentified by the printing process, it addresses during the same process the corresponding character table and reads out the words in order writing them again in the same order into a zone of working memory 15 used as a circular accumulator. Whenever microprocessor 10 receives an interrupt at the TRAP input, it, besides activating timer 17, again reads out from the circular accumulator one of such words and puts it on bus AD0-7. During the same cycle, it puts on bus A8-15 an address which, suitably decoded by network 12, generates signal CE3 selecting register 11; it also lowers its WR-bar output to logical level 0 to indicate that a writing operation is commanded. If the information present on bus AD0-7 diffffers from zero, that is, some printing positions are defined, the output of AND gate 25 rises to logical level 1 and enables the loading of register 11 with the information present on bus AD0-7. At the same time, timer 19 is activated and a printing operation by one or more printing elements is started. If the information on bus AD0-7 is zero, the loading of register 11 and the activation of timer 19 does not occur. In this way, it is possible to use a printing matrix with any resolution greater than the one allowed by the period of timer 19, although with the already mentioned constraints.

Figure 3:
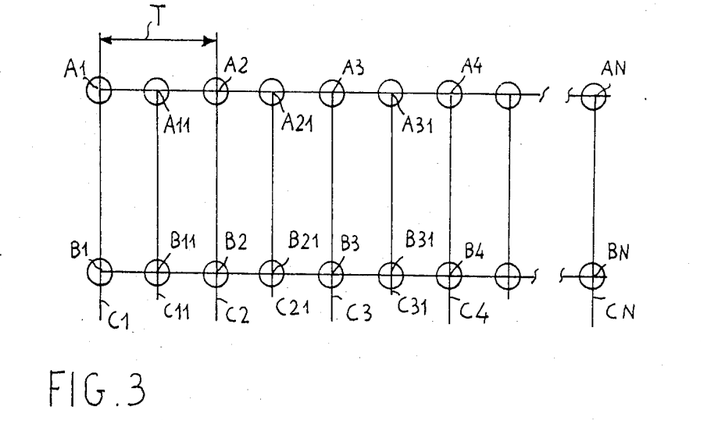
FIG. 3 shows a portion of the printing matrix to point out the graphical advantages achieved by the invention.

FIG. 3 graphically shows the invention advantages with reference to two printing rows, that is, to two contiguous actuation elements. In a conventional system, the actuation period T of the printing elements defines the maximum resolution of the printing matrix and impression dots will therefore be possible only in columns C1, C2, C3, and CN. The only printable diagonal lines are defined by the slopes B1-A2, B1-A3 through B1-AN, or A1-B2, A1-B3 through A1-BN. The invention allows a printing matrix to be defined with one or more intermediate columns C11, C21, and C31 even if the distance between two contiguous columns is shorter than period T. Obviously, diagonals with slopes B1-A11 or A1-B11 cannot be printed, but diagonals with slopes B1-A21, B1-A31 etc., or A1-B21, A1-B31 etc. are now printable. That is, the possibility to obtain the printing of a quality character is greatly improved. It is to be noted that the distance between matrix columns C1 and C2, expressed as a time T, corresponds to a geometric distance D given by the formula: $D = T \times V$, where V is the transverse speed of the printing head. With a moderate reduction of the speed, for instance 50%, it is possible to obtain diagonals B1-A2 and A1-B2 having a high slope so that diagonals with higher slopes do not further improve the graphical quality of the characters. For instance, speed V is normally selected so that the distance between printing matrix points A1 and A2 is equal to half of the distance between points A1 and B1. Therefore, diagnoal lines having any slope not gretaer than the one associated with an arc whose tangent is 4 (that is, about 75 degrees) may be virtually printed by means of the present invention and with a speed reduction of 50%, which is commonly adopted to obtain a partial overlapping of contiguous dots printed on the same row.

Figure 4:
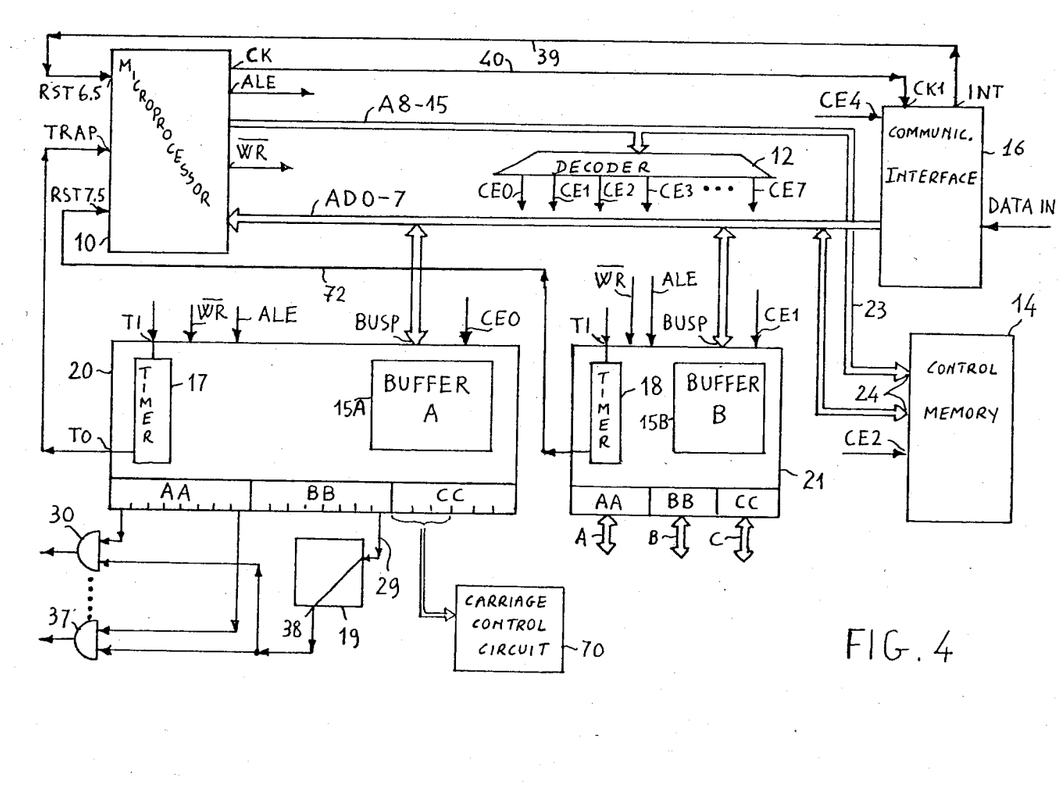
FIG. 4 shows a variant of the embodiment of FIG. 1.

It is to be noted that FIG. 1 shows an exemplifying embodiment of the invention where the desired advantages are achieved by means of logic circuits 25, 26 and 28. It is, however, obvious that the logical function carried out by such circuits may be directly obtained through the logical elements of microprocessor 10 through the execution of a suitable microprogram. FIG. 4 shows such preferred embodiment of the invention. FIG. 4 differs from FIG. 1 in that FIG. 4 lacks elements 25, 26, and 28, and because the function of register 11 is carried out by registers AA and BB of input/output port 20. Since FIG. 4 differs from FIG. 1 only in part, the elements which correspond one to one in FIGS. 1 and 4 have the same reference numbers.

Figure 5:
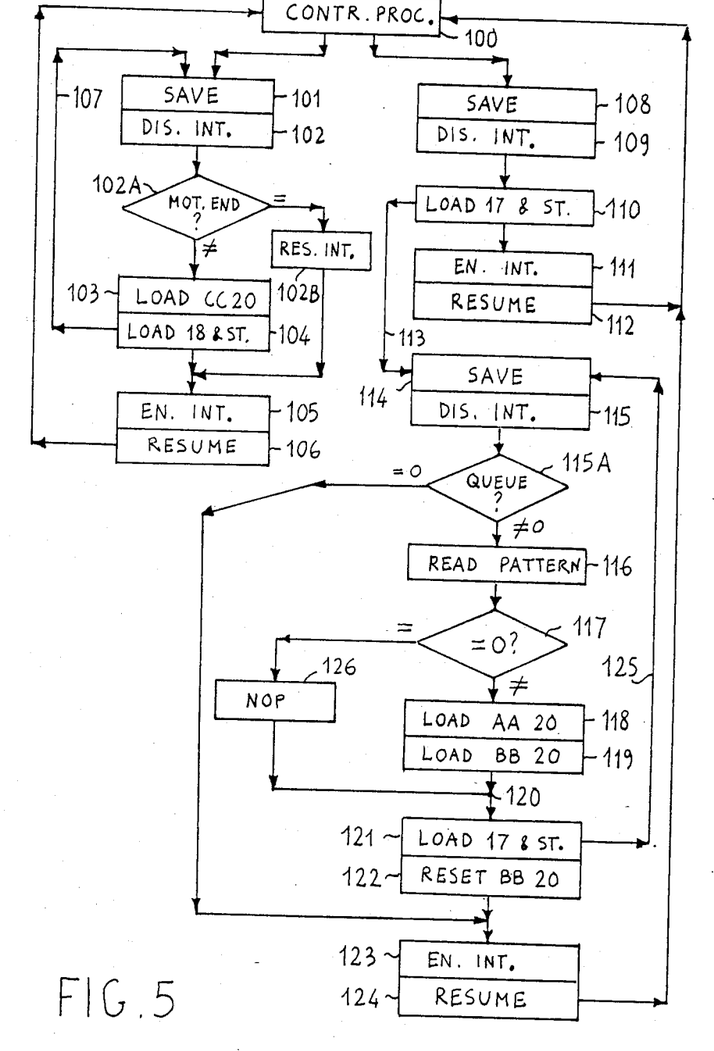
FIG. 5 shows a flow diagram of the printing process executed by the apparatus of FIG. 4.

FIG. 5 shows a flow diagram of the printing process performed by the apparatus of FIG. 4 for obtaining the results outlined with the description of FIG. 1. Starting from a control process, CONTR. PROC., block 100, once established that the characters to be printed in a line have been received and, furthermore, once the line process microprogram has loaded Buffer A 15A or Buffer B 15B (FIG. 4) in suitable order, the printing patterns read out from the character generator and corresponding to the characters to be printed, the printing process microprogram can be activated. As the printing involves the motion of the carriage on which the printing head is mounted, the carriage motion process microprogram is activated and, contemporaneously, the status and the address of the carriage motion process microprogram are saved in order to recall it later on (SAVE, block 101).

The carriage motion process executes very simple operations. First, it inhibits processor 10 from receiving possible interrupts so that the following operations can be executed without interferences (DIS. INT., block 102). The microprocessor 10 loads into suitable cells of register CC of circuit 20 a binary code which is sent to a carriage control circuit 70 (FIG. 4) to operate it (LOAD CC 20, block 103). It further loads timer 18 with a binary code representative of a time duration and activates it (LOAD 18 & ST., block 104). In other words, timer 18 starts to count down owing to clock pulses CK applied to its TI input and, after a pre-determined time, it generates an interrupt signal on its TO output. This signal is sent to input RST 7.5 of microprocessor 10 through line 72 (FIG. 4). Eventually, the process enables microprocessor 10 to receive interrupts (EN. INT., block 105) and returns to execute the interrupted control process (RESUME, block 106). The carriage motion process is typically executed in a very short time, about 20 microseconds, and it is automatically recalled by the interrupt signal sent by timer 18. This interrupt signal (flow line 107) causes return to block 101. Typically, the time interval between subsequent interrupts received from processor 10 at input RST 7.5 is longer than 500 microseconds so that the carriage motion process engages the system for a time period not longer than 20 microseconds $\times 2 \times 10$ to the third, or 40 milliseconds.

For description completeness, FIG. 5 also shows how the carriage motion process is stopped. At the beginning of each phase of the carriage motion process, it is verified whether a carriage motion end flag (MOT. END, block 102A) is present in a suitable memory location. If this flag is absent, the process goes on as already described. If the flag is present, the process resets the received interrupt signal (RES. INT., block 102B) and goes directly on to execute the operations of block 105. Once the carriage is moving, the printing operations must be started so it is necessary to define which are the printing elements to be actuated and the instants when they must be actuated. Therefore, the control process (block 100) recalls the printing process microprogram. The status and the address of the control process are saved (SAVE, block 108). Then, microprocessor 10 is inhibited from receiving interrupts (DIS. INT., block 109). Timer 17 is then loaded with a binary code indicating the time and, therefore, the position of the first matrix printing column. Timer 17 is thereafter activated (LOAD 17 & ST., block 110). The microprocessor 10 is then enabled to receive interrupts (EN. INT., block 111) and the interrupted control process is recalled (RESUME, block 112). After a pre-determined time, timer 17 generates an interrupt signal which is received by microprocessor 10 at the TRAP input (flow line 113). The current process is interrupted and the printing process microprogram is recalled. The status and the address of the interrupted process are saved (SAVE, block 114). The interrupts are masked in order that the printing process microprogram can be executed without interrupts (DIS. INT., block 115).

The queue or circular accumulator pointer is tested to determine whether the queue is empty (QUEUE, block 115A). If the queue is empty, the microprogram jumps to block 123, otherwise the microprogram goes on executing the operations of block 116. The binary code corresponding to the pattern to be printed is read out from the circular accumulator (READ PATTERN, block 116). Microprocessor 10 tests if such code is equal to 0 or not, that is, it determines if printing operations are required (block 117). If printing operations are required (PATTERN is not equal to 0), it loads register AA of circuit 20 with the read code (LOAD AA 20, block 118) and loads register BB of circuit 20 with a code in which at least one bit is equal to 1 (LOAD BB 20, block 119). The output of register BB cell containing this bit is connected through a line 29 to the input of timer 19 (FIG. 4) and the timer is activated. Each of the outputs of register AA is connected respectively to an input of AND gates 30 through 37, which receive at a second input, the signal output by timer 19. This starts a selective energization of the printing elements.

Considering again block 117, if printing operations are not required, the process goes on executing a suitable number of non-operations, (NOPS, block 126) which do not modify the content of registers AA and BB of circuit 20 and then it goes to node 120. At this point, the printing process loads timer 17, activates it (LOAD 17 & ST., block 121) and resets register BB of circuit 20 (RESET BB 20, block 122). The bit, equal to 1 in the register BB, must be present only for the time necessary to discharge capacitor 44 of timer 19 (FIG. 2). The printing process can now end, microprocessor 10 is enabled to receive interrupts (EN. INT., block 123), and the interrupted process is recalled (RESUME, block 124).

The printing process is recalled later by the interrupt generated by timer 17 which forces the jump from block 121 to block 114 (flow line 125). Typically, the disclosed printing process runs in a very short time, about 30 microseconds, and it is automatically recalled by the interrupt signal generated by timer 17, except in the case where the queue is empty (block 115A), that is, the printing pattern list is exhausted. The repetition period of the interrupts generated by timer 17 depends upon the desired printing matrix resolution. For instance, if this period has a length of 500 microseconds, the printing process engages the system for about 30 microseconds $\times 2 \times 1000 = 60$ milliseconds over a one second period. However, if this period is reduced to 100 microseconds, the printing process engages the system for about 30 microseconds $\times 1000 = 300$ milliseconds over a one second period.

It is therefore clear that the invention apparatus, as disclosed, allows the use of printing matrixes with high resolution, but that a limit exists for the practically adoptable resolution, such limit being imposed by two factors. In addition, the higher the adopted resolution is, the greater is the size and the cost of the character generator representing the characters in the matrix. The higher the adopted resolution is, the greater is the engagement of the programmed system for handling the printing operations. A greater engagement of the programmed system involves a higher intereference risk among different processes. For instance, as previously discussed, the line process has to also handle the information reception through communication interface 16. For instance, if the line transfer rate is 9,600 baud, interface 16 will interrupt microprocessor 10 each millisecond or require the loading and the related processing of a character. These operations do not need to be immediately executed. As soon as interface 16 has the information available, it generates the interrupt signal, but it is essential that the operations be executed within 1 millisecond, otherwise the information is lost. The greater the engagement of the system in executing the printing process, the more diffficult is the execution of the line process within the allowed time interval.

In order to avoid the two mentioned inconveniences, the preferred embodiment of the invention comprises a further feature. This feature consists of using a character generator where each character table is constituted of binary words related only to those printing matrix columns requiring at least one dot printing. In other words, each character table does not contain those binary words which relate to printing matrix columns requiring no dot printing. To establish the correspondence between binary words and printing matrix columns, each character table further contains additional binary words which define a binary code: (a) the distance between the first column to be printed and the first matrix column; (b) the distance between each column to be printed (except the first one) and the previous column to be printed; and (c) the distance between the last column to be printed and the last matrix column. These distances can be expressed as a multiple of a distance between columns of a virtual printing matrix with very high resolution. This structure allows for compression of the character tables. Suppose that each character can be printed through dots arranged according to a printing matrix of 8 rows by 64 columns. A conventional character table would require 64 bytes, one byte per matrix column. However, if the control characteristics of the printing elements impose that once a column has been printed the subsequent 5 columns cannot be printed, it is certain that at least 53 of such bytes have a binary code equal to zero and, consequently, that no more than 11 columns have a binary code other than zero. All the codes equal to zero may be left out from the character table if a correspondence between non-zero binary codes and matrix columns is established. For each remaining binary code, such correspondence is established by distance binary codes defined according to the above mentioned criterium.

In the above example, it is therefore clear that a character table contains, in the worst case, 23 bytes and a considerable reduction of the memory space required to store such table is obtained. It is further clear that, generally, it is not necessary to use all the second binary codes to express the distance of the corresponding printing column, but one or more bits can be used to control the actuation of one or more printing elements exceeding the eight ones controlled by the first binary code. According to this aspect, the invention solves the problem of contolling a printing head having more than 8 needles without involving an oversized character generator. According to a further and more important aspect, the invention reduces to a minimum the engagement of the system for executing the printing process because the interrupt frequency of microprocessor 10 for the printing process execution is greatly reduced.

Figure 6:
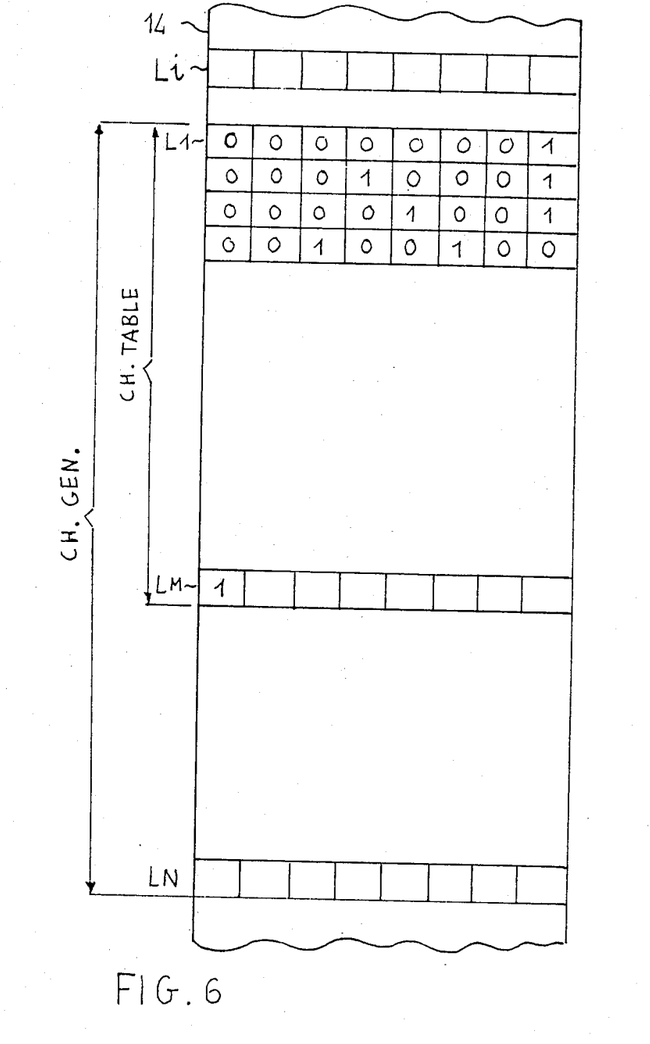
FIG. 6 shows a preferred organization of the character generation table for the apparatus of FIG. 4.

FIG. 6 shows an example of a character generator structured according to such invention aspect. Memory 14 comprises a plurality of addressable locations $L_i$, each having a capacity of 8 bits. A suitable number of locations from $L_i$ to $L_N$ constitutes a character generator CH. GEN. Within the character generator a suitable number of locations from $L_i$ to $L_m$ constitutes a description table CH. TABLE for one character. The last location LM of each character table contains a binary code where the most significant bit is set to 1 to indicate the end of the character table. The code stored in location 1 specifies the distance between the first matrix column and the column where the printing pattern defined by the code stored in location L2 must be printed. For instance, code 00000001 stored in location $L_i$ states that the printing pattern of location L2 must be printed at a distance of one column from the first matrix column, that is, in the second matrix column. Pattern 00010001 contained in location L2 states that printing elements 1 and 5 must be actuated (in column 2). Subsequent location L3, containing binary code 00001001, states that the printing pattern stored in location L4 must be printed at a distance of 9 columns from the previous printed column (column 2), that is, in column 11. Pattern 00100100, stored in location L4, states that printing elements 3 and 6 must be actuated (in column 11). The last location LM defines the distance from the last printed column to the last matrix column. It is clear that the character generator CH. GEN. contains as many character description tables CH. TABLE as there are printable characters.

Figure 7:
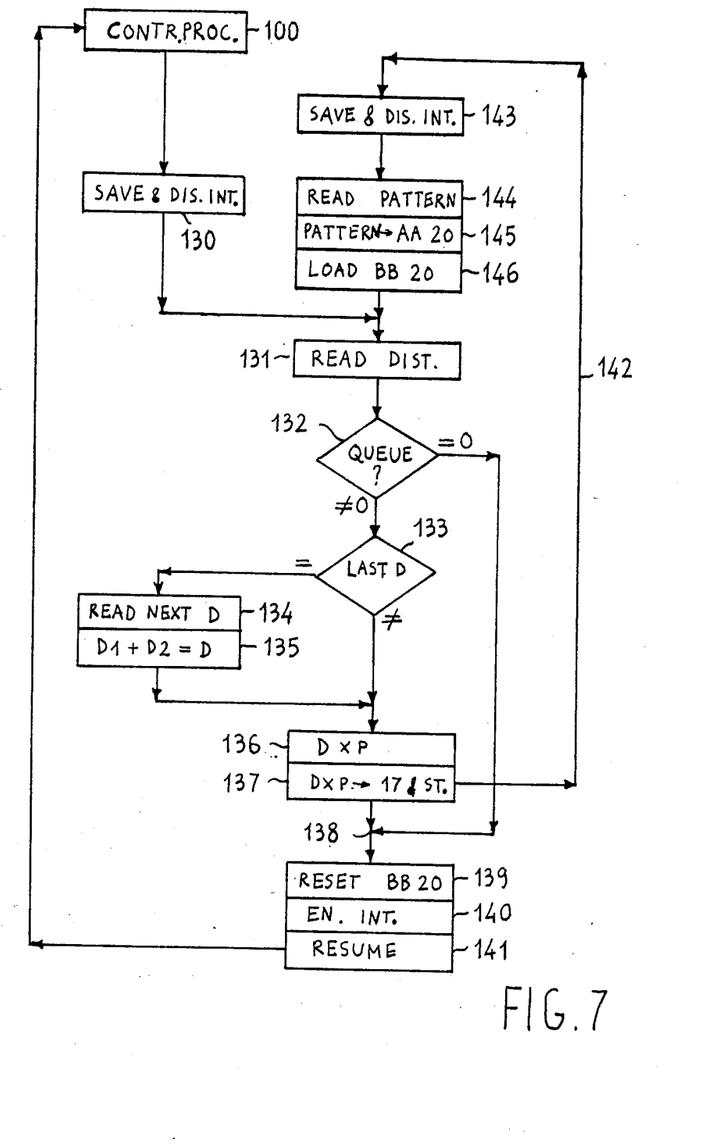
FIG. 7 shows a flow diagram of the printing process executed by the apparatus of FIG. 4 when the character generation table is organized as shown in FIG. 6.

FIG. 7 shows the flow diagram of the printing process that the apparatus in FIG. 4 executes when the character generator of FIG. 6 is used. Even in this case, the printing process does not directly use the information read out from the character generator. Instead, the information necessary to the printing process is loaded in advance into the circular accumulator by the control process. Further, the information read out from the character generator may be preprocessed and the circular accumulator may be loaded with such preprocessed information in order to reduce to a minimum the operations executed by the printing process. However, for clearness sake, the printing process shown in FIG. 7 includes such preprocessing, too.

As already described with reference to FIG. 5, the printing process is recalled from the control process (block 100) after: characters to be printed on a line have been received; the line process has read out from character generator in memory 14 (FIG. 6) the information (printing patterns and related distances) corresponding to the received characters to be printed and has loaded the accumulator 15 (FIG. 4) with such information according to a suitable order; and the printing carriage motion has been started by the correponding process. The status and the address of the control process are saved and microprocessor 10 is inhibited from receiving interrupts (block 130). The first byte L1 of the charcter table corresponding to the character to be printed is then read out from the accumulator (READ DIST., block 131). The accumulator or queue is tested to verify if it is empty, that is, if the printing process has to stop (block 132). In the empty queue case, the process jumps to node 138 where: register BB of circuit 20 is reset (block 139), microprocessor 10 is enabled to receive interrupts (block 140) and return is made to the control process (block 141). In the non-empty queue case, the process goes from block 132 to block 133 and it verifies if the read out informatin is the last byte of a character table, that is, if the most significant bit is 1. If it is the last byte of a character table, the content of laction L1 of the character table related to the subsequent character to be printed is read out from the accumulator (block 134). This content is added to the previously read out distance D1 (block 135) and then the operations shown in block 136 are executed. In block 133, if it is not the last byte of a character table, the process jumps directly to block 136. Distance D obtained by the operation in block 131 or distance D1+D2 obtained by the operation in block 135 is multiplied by a binary code P defining a basic time period corresponding to the printing matrix pitch (block 136). The resulting procuct is loaded into timer 17 which is activated (block 137). Through node 138, the process enters block 139 where register BB of circuit 20 is reset. Eventually, microprocessor 10 is again enabled to receive interrupts (block 140) and the control process is recalled (block 141).

When timer 17, already activated, reaches the zero output configuration, an interrupt signal is generated which recalls the printing process (flow line 142). The status and the address of the process in progress are then saved and the interrupts are masked (block 143). The printing pattern information, following the already read out distance information, is read out from the queue (circular accumulator) (block 144). The printing pattern information is loaded into register AA of circuit 20 (block 145). Then, register BB of circuit 20 is loaded with a binary code having at least one bit equal to 1 (block 146). Then, the subsequent information, that is the distance of the subsequent pattern, is read out from the circular accumulator (block 131). In other words, the process already described by blocks 131 to 141 is repeated.

It is to be noted that the printing process develops with different formalities during the several recalling phases. When the printing process is recalled from the first time, it only loads and activates timer 17 to define when an impression operation must occur. When the printing process is recalled by an interrupt, it generates the necessary printing commands and activates timer 17 again. Further, if the printing of a character has been completed, timer 17 is loaded with a sum indicative of both of the distance between the last printed column and the last printing matrix column and the distance of the first column to be printed of the new character from the first matrix column. In the case where there are no other characters to be printed, the timer is no longer activated.

It is clear from the above description that the printing process interrupts microprocessor 10 only if printing operations are required in a printing matrix column, therefore, with an interrupt period which is variable but not shorter than the printing elements energization period. In one sense, such variable period defines a printing matrix having a column pitch varying according to the graphic symbol to be printed. In this way, the printing process imposes a greatly reduced engagement of microprocessor 10 and the use of a printing matrix with high resolution does not involve problems of system saturation.

Such invention features can also be advantageously applied to microprogrammed control apparatus where each printing element is provided with an independent energization unit.

Further, these features of the invention can be advantageously combined with other teachings of the prior art, such as the one to achieve a higher vertical (or among rows) resolution. Such resolution is obtained in the prior art using printing heads provided with several needle columns vertically staggered so as to obtain printing dots which partially overlap in vertical directions. Alternatively, a higher vertical resolution is obtained in the prior art by printing the graphic symbols with several passings along the printing line and with a vertical shift of the printing support between one passing and the subsequent one equal to a fraction or not integral multiple quantity of the vertical pitch of the printing elements.

It is clear that the above description refers to preferred embodiments of the invention and that several variants may be made without departing from the scope of the invention. For instance, it is not necessary that the character description tables contain a binary code indicative of the distance between the last column to be printed and the last matrix column. In fact, such information can be obtained by subtracting the sum of the relative distances of the several columns to be printed and the distance of the first colunmn to be printed from the first matrix column from the fixed number of printing matrix columns. The disclosed solution is, however, advantageous because it allows the use of a printing matrix having a number of columns varying according to the character to be printed. This feature is essential for adding the differential spacing performance to the quality printing.

While the invention has been shown and described with reference to the preferred embodiment thereof, it will be understood by those skilled in the art that the above and other changes in form and detail may be made therein without departing from the spirit and scope of the invention.

What is claimed is:

1. A microprogrammed control apparatus for dot matrix serial printers having a plurality of print elements comprising:

a central processor;

a first timing unit for generating an interrupt periodically interrupting said central processor to control the possible execution of printing operation by said plurality of printing elements in a printing matrix column defined by said interrupt;

a register loaded by said central processor in response to said interrupt, said central processor loading said register with a printing pattern defining which of said plurality of printing elements must be actuated;

a second timing unit common to all printing elements of said plurality of printing elements, said second timing unit for defining an energization period T during which all printing elements to be actuated of said plurality of printing elements are energized, said second timing unit being activated by said central processor in response to said interrupt; and a first means to inhibit both the loading of said register and the activation of said second timing unit when no impression is required in a matrix column.

2. The apparatus as in claim 1 wherein said first means further comprises:

character description tables, each of said character description tables having locations containing a first plurality of binary codes, each of said first plurality of binary codes indicative of a printing pattern related to a matrix column requiring at least one printing operation (hereinafter referred to as "column to be printed"), each of said character description tables also having locations containing a second plurality of binary codes, each of said second plurality of binary codes defining the distance of a corresponding column to be printed from the previous column to be printed of the table or from a first printing matrix column when the corresponding column to be printed is the first column to be printed of the table; and second means to subsequently load said first timing unit with an information equal or proportion to each of the codes of said second plurality of binary codes, said first timing unit thereby generating interrupts with a period varying according to said codes of said second plurality of binary codes.

3. The apparatus as in claim 2 wherein said variable period is greater than said period T.

4. A printing control method for a matrix serial printer provided with a microprogrammed control apparatus wherein a central processor is periodically interrupted by an interrupt generated by a presettable timing unit to control the possible execution of printing operations in a printing matrix column defined by said interrupt by means of the selective generation of printing commands, one printing command for each of a plurality of printing elements, a printing control method comprising: loading said timing unit a first time and at each subsequent interrupted generated by said unit with a binary code variable each time, said binary code defining a variable interrupt period corresponding to a printing matrix having a column pitch varying according to the graphic symbol to be printed.

5. The method as in claim 4 wherein said variable interrupt period is not shorter than an energization period required for the actuation of the printing elements and is a multiple of a basic period shorter than said energization period.

* * * * *